(12) United States Patent
Wakefield et al.

(10) Patent No.: US 10,578,130 B2
(45) Date of Patent: Mar. 3, 2020

(54) RESERVOIR VENT AND THERMAL STABILIZATION ORIFICE

(71) Applicant: HAMILTON SUNDSTRAND CORPORATION, Windsor Locks, CT (US)

(72) Inventors: David L. Wakefield, Loves Park, IL (US); Charles E. Reuter, Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1706 days.

(21) Appl. No.: 13/865,258

(22) Filed: Apr. 18, 2013

(65) Prior Publication Data

US 2014/0314595 A1   Oct. 23, 2014

(51) Int. Cl.
*F15B 1/26* (2006.01)
*F15B 21/044* (2019.01)
*B64D 37/20* (2006.01)

(52) U.S. Cl.
CPC .............. *F15B 1/265* (2013.01); *B64D 37/20* (2013.01); *F15B 21/044* (2013.01); *F15B 2201/31* (2013.01)

(58) Field of Classification Search
CPC .............................. F15B 1/265; F15B 2201/31
See application file for complete search history.

(56) References Cited

U.S. PATENT DOCUMENTS

| | | | | |
|---|---|---|---|---|
| 2,830,609 A | | 4/1958 | Kazimierz et al. | |
| 2,937,663 A | * | 5/1960 | Ashton et al. | 138/31 |
| 3,015,345 A | * | 1/1962 | Michael | 138/31 |
| 3,351,097 A | * | 11/1967 | Moran | 138/30 |
| 3,667,223 A | * | 6/1972 | Thurston | 60/403 |
| 4,538,972 A | * | 9/1985 | Gooden | 417/540 |
| 5,181,837 A | * | 1/1993 | Niemiec | 417/350 |
| 5,326,386 A | | 7/1994 | Lee et al. | |
| 6,267,147 B1 | | 7/2001 | Rago | |
| 6,390,133 B1 | | 5/2002 | Patterson et al. | |
| 6,530,350 B2 | * | 3/2003 | Chiappini et al. | 123/90.12 |

(Continued)

FOREIGN PATENT DOCUMENTS

| | | |
|---|---|---|
| DE | 1205390 B | 11/1965 |
| EP | 0356780 A2 | 3/1990 |
| GB | 879716 A | 10/1961 |

OTHER PUBLICATIONS

European Search Report for European Patent Application No. EP14164095.3 dated Sep. 4, 2014.

*Primary Examiner* — Thomas E Lazo
*Assistant Examiner* — Michael Quandt
(74) *Attorney, Agent, or Firm* — Carlson, Gaskey & Olds, P.C.

(57) ABSTRACT

A reservoir includes first and second chambers, and a piston having first and second ends disposed in the first and second chambers, respectively. The first and second ends isolate a first area from a second area within the first and second chambers. The first area of the first chamber is in fluid communication with a high pressure fluid source and the second area of the first chamber is in fluid communication with a low pressure fluid source. An orifice is formed in the first end and is configured to allow fluid communication between the upper and lower areas of the first chamber. A pumping system and an aircraft are also disclosed.

21 Claims, 3 Drawing Sheets

(56) References Cited

U.S. PATENT DOCUMENTS

| | | |
|---|---|---|
| 6,923,215 B2 | 8/2005 | Weber |
| 6,991,000 B2 | 1/2006 | Jeter et al. |
| 7,107,767 B2 | 9/2006 | Frazer et al. |
| 7,395,838 B2 | 7/2008 | Weber et al. |
| 7,971,608 B2 | 7/2011 | Crimpita |
| 8,181,746 B2 | 5/2012 | Szolomayer et al. |
| 2009/0064674 A1 | 3/2009 | Davidsson |
| 2012/0181112 A1 | 7/2012 | Szolomayer et al. |
| 2012/0186653 A1 | 7/2012 | Norem et al. |
| 2012/0192974 A1 | 8/2012 | Szolomayer et al. |
| 2012/0318239 A1 | 12/2012 | Sturman |

* cited by examiner

RESERVOIR VENT AND THERMAL STABILIZATION ORIFICE

BACKGROUND

This disclosure relates to an orifice for venting a reservoir and promoting thermal stabilization of a pumping system.

Reservoirs are commonly used in various fluid systems for accommodating thermal expansion of the fluid and providing a reserve of fluid to make up for any leakage from the system. In pressurized reservoirs, the presence of an excessive amount of air can be problematic for maintaining pressure and obtaining accurate fluid level measurements. Therefore, it is necessary to periodically manually vent the reservoir to remove any accumulated air.

One type of pressurized reservoir is a bootstrap reservoir, which employs the discharge from a pump that circulates the fluid to increase fluid pressure at the pump inlet. In a bootstrap reservoir, a double ended piston is actuated by a pump discharge pressure and in turn pressurizes fluid at the pump inlet.

In many current bootstrap reservoir systems, the reservoir is not an active part of the flow circuit. That is, the fluid within the reservoir is typically in an essentially static state and the only fluid movement into or out of the reservoir is in response to thermal expansion of the fluid or, more rarely, in response to leakage occurring in the external circuit. Systems operating in extreme environmental conditions, for example, during high-altitude flight of an aircraft, can exhibit a large difference in the temperature of the fluid in an actively flowing circuit of the system and that of the fluid in the reservoir.

In a sudden event, such as a major leak or other system flow demand, cold fluid exiting the reservoir can impose a thermal shock on other parts of the system, which may have undesirable effects. Further, if the reservoir temperature is significantly lower than that of the main bulk fluid, increased viscosity of the colder reservoir fluid may reduce the dynamic response of the reservoir, causing insufficient and slow supply of fluid to the operating system. If the pressure in the system becomes too low or there is not enough fluid in the system, the pump(s) may operate inefficiently or be damaged by cavitation.

Additionally, air may become trapped in the bootstrap reservoir and can act as a compressible spring on the piston. Fluctuations in the reservoir environment, such as the ambient temperature, can change the properties of the air and cause the piston to move, which can in turn cause pressure fluctuations throughout the system. Current reservoir designs can be difficult to vent due to the lack of accessibility to the chambers once the system is installed in the aircraft or other machine.

SUMMARY

A reservoir includes first and second chambers, and a piston having first and second ends disposed in the first and second chambers, respectively. The first and second ends isolate a first area from a second area within the first and second chambers. The first area of the first chamber is in fluid communication with a high pressure fluid source and the second area of the first chamber is in fluid communication with a low pressure fluid source. An orifice is formed in the first end and is configured to allow fluid communication between the upper and lower areas of the first chamber. A pumping system and an aircraft are also disclosed, illustrating one potential embodiment of the invention.

BRIEF DESCRIPTION OF THE DRAWINGS

The disclosure can be further understood by reference to the following detailed description when considered in connection with the accompanying drawings wherein.

DETAILED DESCRIPTION

Figure 1:
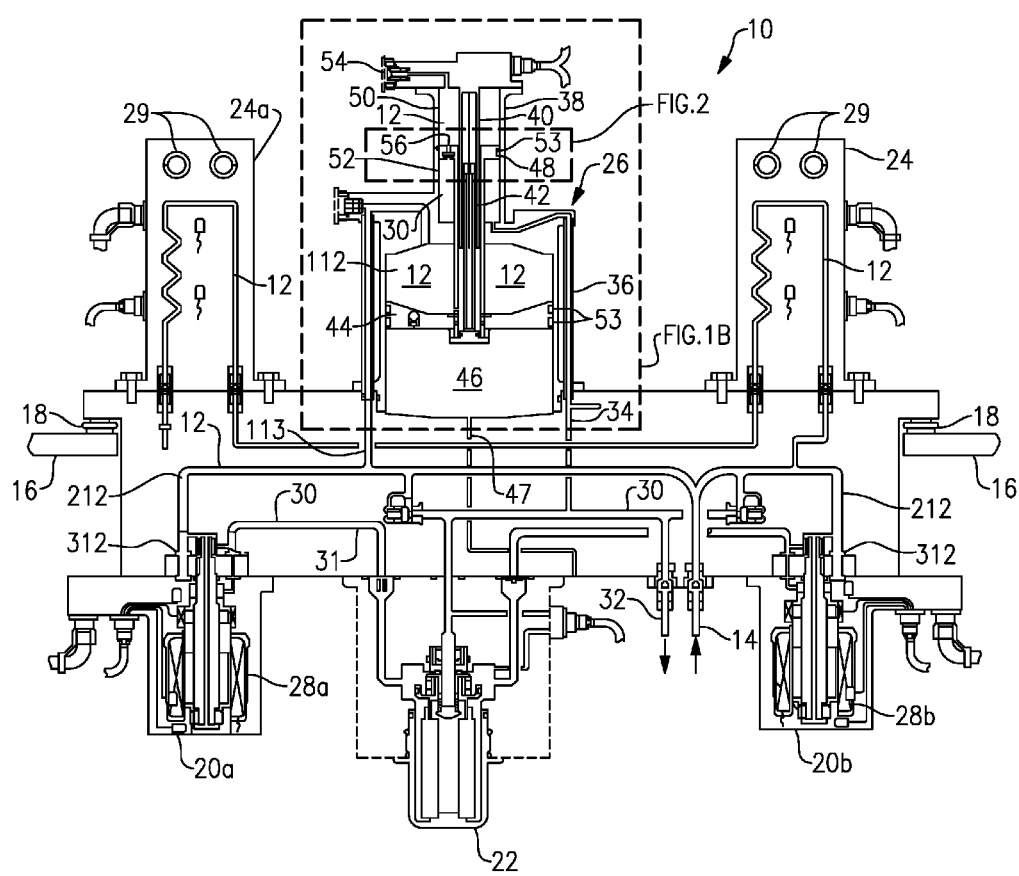
FIG. 1 schematically illustrates a pumping system with a reservoir vent and thermal stabilization orifice.

FIG. 1 schematically illustrates a pumping system 10. The pumping system 10 can be used to pump various fluids 12, such as water, fuel, propylene glycol, hydraulic fluid, etc., or a mixture thereof, within an aircraft or another machine. The pumping system 10 may be charged with fluid 12 from a source 14. In one example, the source 14 supplies fluid 12 to the pumping system 10 from aircraft pack bays (not shown). The pumping system 10 may be mounted to the aircraft or other machine by mounting brackets 16. The mounting brackets 16 may be fitted with vibration isolators 18.

The pumping system 10 may include first and second pumps 20a, 20b, a filter 22, one or more motor controllers 24a, 24b, and a bootstrap reservoir 26. In the example of FIG. 1, the pumps 20a, 20b are rotor pumps with permanent magnet motors 28a, 28b, but in another example the pumps 20a, 20b may be different types of pumps. The motor controllers 24a, 24b may control the motors 28a, 28b and may receive power and control signals from electrical connectors 29. In a further example, the pumping system 10 may not include a filter 22 and one example may include a heat exchanger (not shown). As can be seen, the source 14 communicates low pressure fluid 12 to pump inlets 312 through passages 212.

As can be appreciated, pressurized fluid 30 exiting the first pump 20a may flow through the filter 22 via conduit 31 and may then be supplied to an outlet 32 for use in an aircraft or machine. In one example, the outlet 32 may feed into an aircraft bulk cargo bay (not shown). Pressurized fluid 30 may also be supplied to the bootstrap reservoir 26 via conduit 34. The second pump 20b circulates fluid 12 from the source 14 to the filter 22 as necessary. Fluid 12 is also communicated to the bootstrap reservoir 26, and more specifically, to the chamber 112 and the upper low pressure area 50, from the source 14 via a passage 113.

Figure 1B:
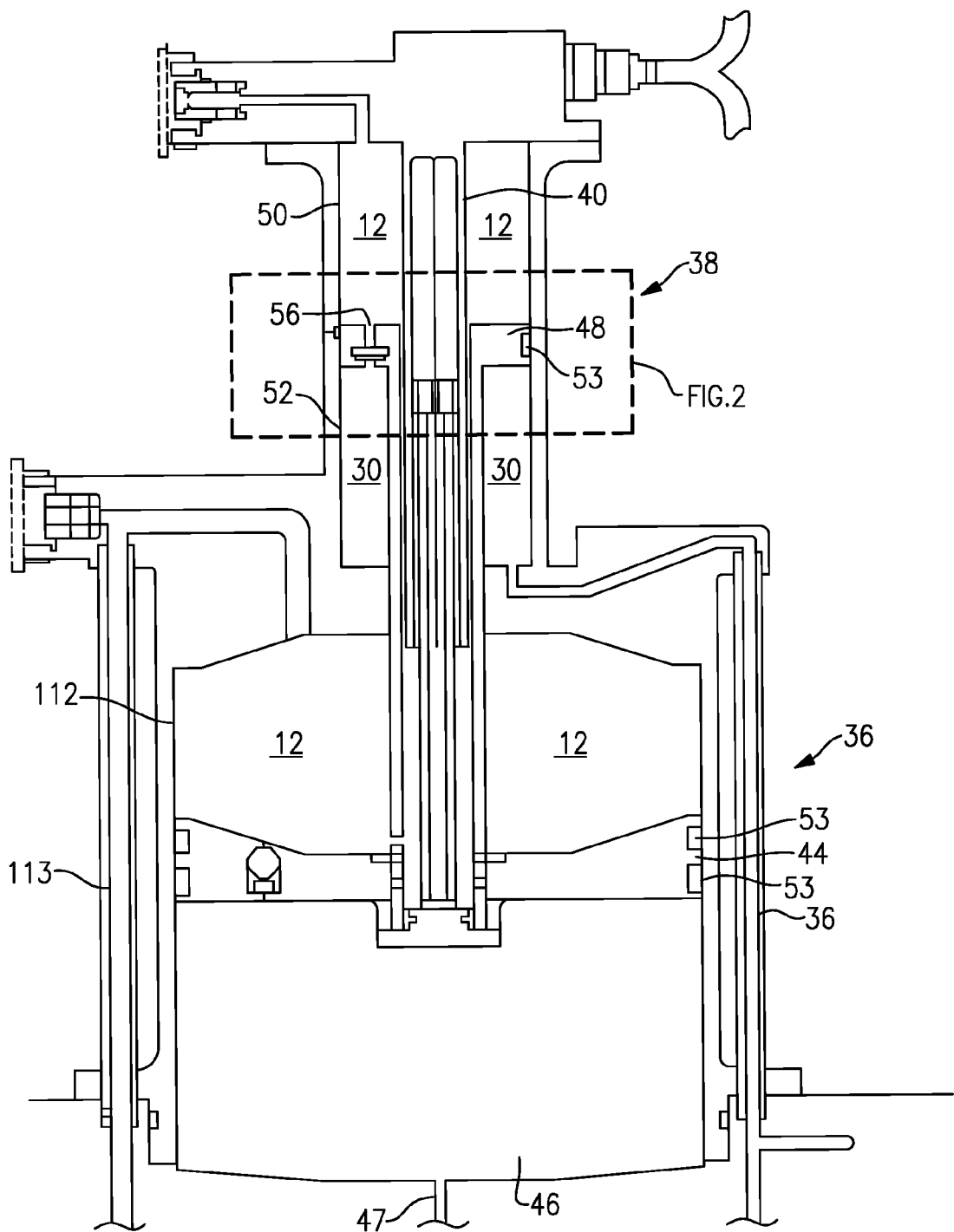
FIG. 1B shows a detail view of the reservoir of FIG. 1.

The bootstrap reservoir 26 includes a lower chamber 36 and an upper chamber 38. A channel 40 runs through both the lower and upper chamber 36, 38. A double ended piston 42 is arranged inside the channel 40. A first end 44 of the piston 42 is disposed inside the lower chamber 36, isolating the fluid 12 in a chamber 112 from an ambient air pressure area 46. The ambient air pressure area 46 can receive ambient air by a conduit 47. A second end 48 of the piston 42 is disposed in the upper chamber 38, isolating the fluid 12 in an upper low pressure area 50 from the pressurized fluid 30 in a lower high pressure area 52. The upper low pressure area 50 is in fluid communication with the chamber 112 via the channel 40, as is shown in FIG. 1B. Seals 53, such as O-ring seals, may prevent fluid from leaking around the sides of the first and second ends 44, 48 of the piston.

Figure 2:
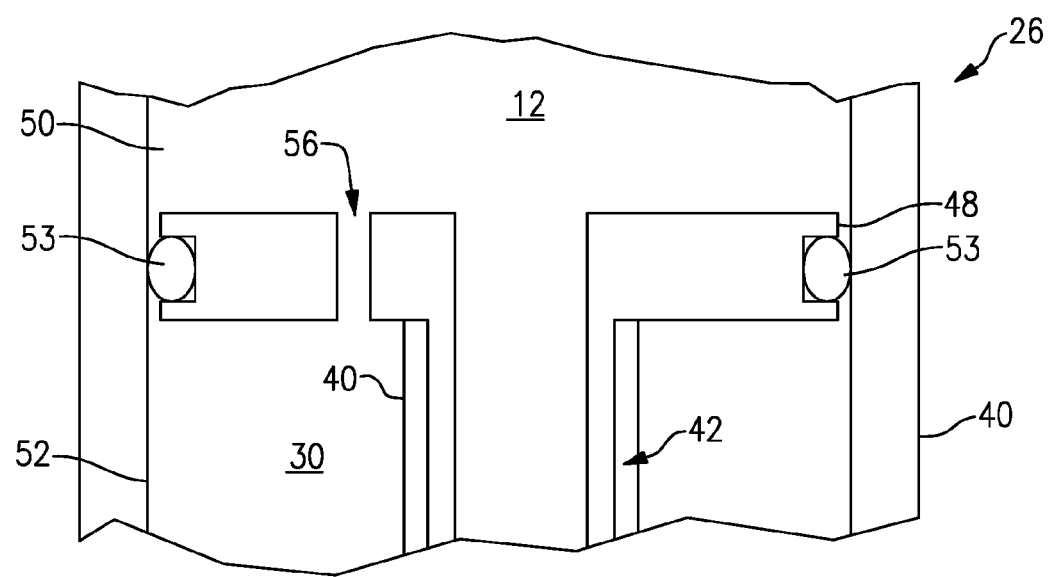
FIG. 2 schematically illustrates a detail view of the orifice.

The bootstrap reservoir 26 may include manual bleed valves 54 to release air trapped in the low pressure area 50 and chamber 112. FIG. 2 shows a detail view of the second end 48 of the piston 42 including an orifice 56. The orifice 56 in the second end 48 of the piston 42 allows air trapped in the high pressure area 52 to vent to the low pressure area 50 and allows fluid 12 and high pressure fluid 30 to circulate around the reservoir 26 and pumping system 10. The orifice may be between 0.010-0.055 inches (0.254-1.397 mm) in diameter, in one example.

Referring again to FIG. 1, in certain operating conditions, for example, at high-altitude flight, the pumping system 10 may be subject to low ambient air pressures, which may cause the absolute pressure of fluid 12 in the system 10 to be decreased. If the pressure in the pumping system 10 is too low, the pumps 20a, 20b may not operate efficiently or may cavitate. In operation, the bootstrap reservoir 26 maintains fluid 12 pressure. The pressurized fluid 30 in the high pressure area 52 pushes the piston 42, including both the first and second ends 44, 48, upward. Thus, a pressure on the fluid 12 in the chamber 36 is maintained. A passage 113 communicates chamber 112 to the passages 212, which, in turn, maintains a pressure at the pump inlets 312 and throughout the pumping system 10.

The orifice 56 allows air trapped in the high pressure area 52 to vent to the low pressure area 50. If air is trapped in the high pressure area 52, it can act as a spring on the piston 42, because it is more compressible than the high pressure fluid 30. Temperature or other changes in the reservoir 26 may cause fluctuations in the properties of air trapped in the high pressure area 52, which may cause undesired movement of the piston 42 and therefore undesired pressure fluctuations throughout the pumping system 10.

The orifice 56 also allows for a constant circulation of a small amount of fluid 12 and high pressure fluid 30 to circulate through the low pressure and high pressure areas 50, 52. In one example, the flowrate through the orifice is between 0.04-1.3 GPM (0.0000151-0.00492 m³/min). The fluid 12 collected in the reservoir 26 may become colder and more viscous than the fluid 12 in the rest of the pumping system 10. In the event of a leak or another fluid demand in the pumping system 10, the fluid 12 collected in the reservoir 26 may flow out of the reservoir 26 and impose a thermal shock on the system fluid 12. Additionally, the flowrate of fluid 12 out of the reservoir may be slow due to its increased viscosity. If the amount of fluid 12 in the system is reduced and additional fluid 12 is not supplied by the reservoir 26 quickly enough, there may be insufficient fluid 12 flowrate or pressure to the pumps 20a, 20b, and the pumps 20a, 20b may cavitate. The circulation of fluid 12 and high pressure fluid 30 promoted by the orifice 56 allows for thermal stabilization of the fluid 12 in the reservoir 26, which can reduce the thermal shock imposed on the system 10 and increase the flowrate of fluid 12 out of the reservoir 26 in the event of a sudden fluid 12 demand.

It is recognized that the orifice 56 presents a parasitic power loss to the pumping system 10. In one example, the parasitic power loss imposed on the system 10 due to the orifice 56 is less than 5 watts.

Although example embodiments have been disclosed, a worker of ordinary skill in this art would recognize that certain modifications would come within the scope of the claims. For that and other reasons, the following claims should be studied to determine their true scope and content.

What is claimed is:

1. A reservoir, comprising:
   first and second chambers;
   a piston having first and second ends disposed in the first and second chambers, respectively, the first and second ends defining a first area from a second area within each of the first and second chambers, wherein the first area of the first chamber is in fluid communication with a high pressure fluid source and the second area of the first chamber is in fluid communication with a low pressure fluid source; and
   an orifice formed in the first end, the orifice configured to allow fluid communication between the first and second areas of the first chamber.

2. The reservoir of claim 1, wherein the first area of the second chamber is in fluid communication with the low pressure fluid source.

3. The reservoir of claim 2, wherein the piston is arranged in a channel, and the first area of the second chamber is in fluid communication with the second area of the first chamber via the channel.

4. The reservoir of claim 1, wherein the second area of the second chamber is in fluid communication with ambient air.

5. The reservoir of claim 1, wherein the high pressure fluid source is a pump discharge.

6. The reservoir of claim 1, wherein the low pressure fluid source provides low pressure fluid to a pump.

7. The reservoir of claim 1, wherein the orifice is between 0.010-0.055 inches (0.254-1.397 mm) in diameter.

8. The reservoir of claim 1, wherein the flowrate of fluid through the orifice is between 0.04-1.3 GPM (0.0000151-0.00492 m3/min).

9. The reservoir of claim 1, wherein the low pressure fluid includes at least one of water, fuel, propylene glycol, and hydraulic fluid.

10. A pumping system, comprising:
    at least one pump;
    a bootstrap reservoir in fluid communication with the at least one pump, the reservoir including first and second chambers, a piston having first and second ends disposed in the first and second chambers, respectively, the first and second ends defining a first area from a second area within each of the first and second chambers, and an orifice formed in the first end, the orifice configured to allow fluid communication between the first and second areas of the first chamber; and
    wherein the first area of the first chamber is in fluid communication with a high pressure fluid source and the second area of the first chamber is in fluid communication with a low pressure fluid source.

11. The pumping system of claim 10, wherein the at least one pump comprises first and second pumps.

12. The pumping system of claim 10, wherein the first area of the second chamber is in fluid communication with the second area of the first chamber and with the low pressure fluid source, and the second area of the second chamber is in fluid communication with ambient air.

13. The pumping system of claim 12, wherein the bootstrap reservoir pressurizes the inlet to the at least one pump.

14. The pumping system of claim 13, wherein the high pressure fluid source is a discharge from the at least one pump.

15. The pumping system of claim 14, wherein the low pressure fluid source provides low pressure fluid to the at least one pump.

16. The pumping system of claim 10, where the at least one pump is a rotor pump driven by a permanent magnet motor.

17. An aircraft, comprising:
    a fluid for use in the aircraft;

at least one pump for pumping the fluid;

a bootstrap reservoir in fluid communication with the at least one pump, the reservoir including first and second chambers, a piston having first and second ends disposed in the first and second chambers, respectively, the first and second ends defining a first area from a second area within each of the first and second chambers, and an orifice formed in the first end, the orifice configured to allow fluid communication between the first and second areas of the first chamber; and wherein the first area of the first chamber is in fluid communication with a high pressure fluid source, the first area of the second chamber and the second area of the first chamber area in fluid communication with a low pressure fluid source, and the second area of the second chamber is in fluid communication with ambient air.

18. The aircraft of claim 17, wherein the bootstrap reservoir pressurizes the inlet to the at least one pump.

19. The aircraft of claim 18, wherein the high pressure fluid source is a discharge from the at least one pump and the low pressure fluid source provides low pressure fluid to the at least one pump.

20. The aircraft of claim 17, wherein when mounted on the aircraft, the first chamber is arranged vertically above the second chamber.

21. The aircraft of claim 17, wherein when mounted on the aircraft, the first area of the first chamber is arranged vertically below the second area of the first chamber.

* * * * *